(12) United States Patent
Chen et al.

(10) Patent No.: US 11,823,660 B2
(45) Date of Patent: Nov. 21, 2023

(54) METHOD, APPARATUS AND DEVICE FOR TRAINING NETWORK AND STORAGE MEDIUM

(71) Applicant: BEIJING BAIDU NETCOM SCIENCE AND TECHNOLOGY CO., LTD., Beijing (CN)

(72) Inventors: Li Chen, Beijing (CN); Saisai Zou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 334 days.

(21) Appl. No.: 17/353,758

(22) Filed: Jun. 21, 2021

(65) Prior Publication Data

US 2021/0312910 A1 Oct. 7, 2021

(30) Foreign Application Priority Data

Oct. 15, 2020 (CN) .......................... 202011104612.7

(51) Int. Cl.
*G10L 15/06* (2013.01)
*G06N 3/08* (2023.01)
(Continued)

(52) U.S. Cl.
CPC ............ *G10L 15/063* (2013.01); *G06N 3/044* (2023.01); *G06N 3/08* (2013.01); *G10L 15/02* (2013.01);
(Continued)

(58) Field of Classification Search
CPC ....... G10L 15/063; G10L 15/02; G10L 15/16; G10L 15/1815; G10L 15/22; G10L 21/02;
(Continued)

(56) References Cited

U.S. PATENT DOCUMENTS

2014/0236591 A1 8/2014 Yue et al.
2018/0307745 A1 10/2018 Bachrach et al.
(Continued)

FOREIGN PATENT DOCUMENTS

CN 102722525 A 10/2012
CN 109658921 A 4/2019
(Continued)

*Primary Examiner* — Daniel C Washburn
*Assistant Examiner* — Athar N Pasha
(74) *Attorney, Agent, or Firm* — Cozen O'Connor

(57) ABSTRACT

Embodiments of the present disclosure disclose a method, apparatus and device for training a network, and a storage medium, relate to the field of artificial intelligence technology such as deep learning and speech analysis. A semantic prediction network comprises: an encoder network and at least one decoder network; and a particular solution is: acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and jointly training an initial semantic prediction network and a syllable classification network using the first speech feature of the target speech sample, to obtain a trained semantic prediction network.

20 Claims, 7 Drawing Sheets

(51) Int. Cl.
  *G10L 15/02* (2006.01)
  *G10L 15/16* (2006.01)
  *G10L 15/18* (2013.01)
  *G10L 15/22* (2006.01)
  *G10L 21/02* (2013.01)
  *G06N 3/044* (2023.01)

(52) U.S. Cl.
  CPC .......... *G10L 15/16* (2013.01); *G10L 15/1815* (2013.01); *G10L 15/22* (2013.01); *G10L 21/02* (2013.01); *G10L 2015/027* (2013.01)

(58) Field of Classification Search
  CPC ........... G10L 2015/027; G10L 15/1822; G10L 15/26; G06N 3/044; G06N 3/08; G06N 3/045; G06F 40/216; G06F 40/274; G06F 40/30
  See application file for complete search history.

(56) References Cited

U.S. PATENT DOCUMENTS

2019/0371307 A1    12/2019   Zhao et al.
2022/0328064 A1*   10/2022   Shriberg ................ A61B 5/165

FOREIGN PATENT DOCUMENTS

| CN | 111199727 A | 5/2020 |
| JP | 2000099089 A | 4/2000 |
| JP | 2020-505650 A | 2/2020 |

* cited by examiner

200

Acquiring a first speech feature of a target speech sample; the target speech sample being a synthesized speech sample or a real speech sample, the synthesized speech sample being attached with a sample syllable label and a semantic label including a value of the domain, and the real speech sample being attached with a sample syllable label ⟶ 201

Inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network ⟶ 202

METHOD, APPARATUS AND DEVICE FOR TRAINING NETWORK AND STORAGE MEDIUM

CROSS-REFERENCE TO RELATED APPLICATIONS

This application claims priority to Chinese Patent Application No. 202011104612.7, filed with the China National Intellectual Property Administration (CNIPA) on Oct. 15, 2020, the contents of which are incorporated herein by reference in their entirety.

TECHNICAL FIELD

Embodiments of the present disclosure relate to the field of computer technology, in particular to the field of artificial intelligence technology such as deep learning and speech analysis, and more particular to a method, apparatus and device for training a network, and relate to a computer readable storage medium.

BACKGROUND

With the advancement of speech technology, more and more home electronic devices begin to support speech control, and smart home systems begin to truly enter people's households. A chip-side speech recognition solution becomes a new challenge for people.

At present, the speech recognition technology is basically based on a conventional three-level cascade solution. That is, an acoustic model, a language model and a semantic model are hierarchically connected in series to realize conversion from speech to text and then to semantics. In addition, in a process of converting speech to text, it is necessary to perform decoding by means of cluster search/beam search or weighted finite-state transducer (wfst) to fuse speech and language information, so as to realize speech recognition.

SUMMARY

Embodiments of the present disclosure provide a method, apparatus and device for training a network. Embodiments of the present disclosure also provide a computer readable storage medium.

In a first aspect, an embodiment of the present disclosure provides a method for training a network, wherein an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; and the method comprising: acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network.

In a second aspect, an embodiment of the present disclosure provides a method for recognizing semantics, comprising: acquiring a to-be-recognized speech signal; and inputting the to-be-recognized speech signal into a trained semantic prediction network trained using the method as described in any one of the implementations of the first aspect, to obtain a semantic label of the to-be-recognized speech signal.

In a third aspect, an embodiment of the present disclosure provides an apparatus for training a network, wherein an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; and the apparatus comprising: a sample acquisition module, configured to acquire a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and a joint training module, configured to input the first speech feature into the convolutional layer, input an output feature of the convolutional layer into the long short-term memory network layer, input a first intermediate feature output from the long short-term memory network layer into the each decoder network in the at least one decoder network, use the semantic label corresponding to the first speech feature as an output of the at least one decoder network, use the first intermediate feature as an input of a syllable classification network, use the sample syllable label corresponding to the first speech feature as an output of the syllable classification network, and jointly train the initial semantic prediction network and the syllable classification network to obtain a trained semantic prediction network.

In a fourth aspect, an embodiment of the present disclosure provides an apparatus for recognizing semantics, comprising: acquiring a to-be-recognized speech signal; and inputting the to-be-recognized speech signal into a trained semantic prediction network trained using the method as described in any one of the implementations of the first aspect, to obtain a semantic label of the to-be-recognized speech signal.

In a fifth aspect, an embodiment of the present disclosure provides a chip, being configured with a trained semantic prediction network trained using the method for training a network as described in any one of the implementations of the first aspect.

In a sixth aspect, an embodiment of the present disclosure provides an electronic device, and the electronic device comprises: at least one processor; and a memory communicatively connected with the at least one processor, where the memory stores instructions executable by the at least one processor, and the instructions, when executed by the at least one processor, cause the at least one processor to execute the method as described in any one of the implementations of the first aspect or the second aspect.

In a seventh aspect, an embodiment of the present disclosure provides a non-transitory computer readable storage medium storing computer instructions, where the computer instructions cause a computer to execute the method as described in any one of the implementations of the first aspect or the second aspect.

In the method and apparatus for training a network, the device and the storage medium provided by the embodiments of the present disclosure, an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; first acquiring a first speech feature of a target speech sample; the target speech sample being a synthesized speech sample or a real speech sample, the synthesized speech sample being attached with a sample syllable label and a semantic label comprising a value of the domain, and the real speech sample being attached with the sample syllable label; then inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network. In this process, compared with the three-level cascade speech recognition technology used in Background, in the present disclosure, in the training process of the initial semantic prediction network, training of the syllable classification network may be added to an output side of the encoder network, so that in the joint training process, the semantic label and the sample syllable label are used as constraints on the output of the initial semantic prediction network and the output of the syllable classification network, respectively. The adjustment of a parameter in the initial semantic prediction network enables the intermediate feature output by the encoder to meet the training accuracy of the semantic prediction network and the syllable classification network, thereby using a mixed training sample to improve an accuracy of the intermediate feature output by the encoder, and then may improve a prediction accuracy of the trained semantic prediction network finally obtained. In the present disclosure, semantics of a speech may be analyzed based on the speech, so that a resource overhead of converting speech into text then recognizing the semantics of the text in Background may be reduced, and the present disclosure discards the conventional acoustic decoding in the three-level cascade solution and reduces the amount of calculation.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

By reading the detailed description of non-limiting embodiments with reference to the following accompanying drawings, other features, objectives and advantages of the present disclosure will become more apparent. The accompanying drawings are used to better understand the present solution, and do not constitute a limitation to the present disclosure, in which:

FIG. 2 is a flowchart of an embodiment of a method for training a network according to the present disclosure;

DETAILED DESCRIPTION OF EMBODIMENTS

Exemplary embodiments of the present disclosure are described below in combination with the accompanying drawings, and various details of the embodiments of the present disclosure are comprised in the description to facilitate understanding, and should be considered as exemplary only. Accordingly, it should be recognized by one of ordinary skills in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
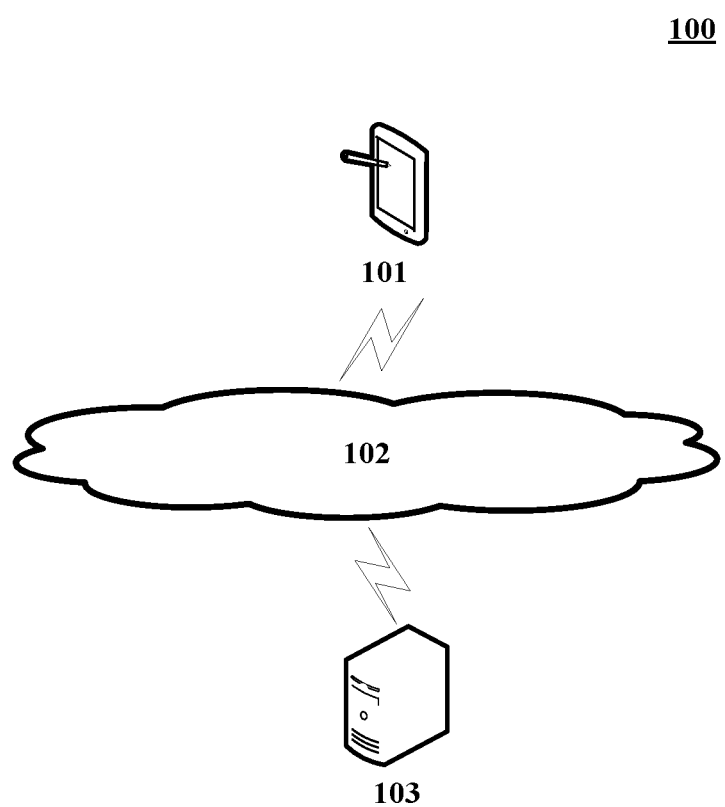
FIG. 1 is an exemplary system architecture to which the present disclosure may be implemented.

FIG. 1 shows an exemplary system architecture 100 to which embodiments of a method for training a network or an apparatus for training a network, or a method for recognizing semantics or an apparatus for recognizing semantics of the present disclosure may be implemented.

As shown in FIG. 1, the system architecture 100 may comprise a client 101, a network 102, and a server 103. The network 102 is used to provide a communication link medium between the client 101 and the server 103. The network 102 may comprise various connection types, such as wired, wireless communication links, or optic fibers.

In a phase of training a semantic prediction network, the server 103 may provide various services. For example, the server 103 may acquire a target speech sample from the client 101; and may use the target speech sample to jointly train an initial semantic prediction network and a syllable classification network to obtain a trained semantic prediction network.

In a phase of predicting a semantic label using the trained semantic prediction network, the client 101 may be used to acquire a to-be-recognized speech signal, and a chip deployed in the client 101 may predict the acquired to-be-recognized speech signal using the trained semantic prediction network, to obtain the semantic label of the to-be-recognized speech signal; or, the client 101 may be used to acquire a to-be-recognized speech signal, and a chip deployed in the server 103 may predict the to-be-recognized speech signal acquired via the client 101 using the trained semantic prediction network, to obtain the semantic label of the to-be-recognized speech signal.

It should be noted that, before the semantic label of the to-be-recognized speech signal is predicted by the semantic prediction network, the server 103 may also deploy the trained semantic prediction network to the chip in the client 101 or the chip in the server 103. The chip may be a microcircuit, a microchip, an integrated circuit (IC) or a digital signal processing (DSP) chip. The chip may also refer to a silicon chip containing an integrated circuit, which may be a part of a computer or other electronic device.

It should be noted that the server 103 may be hardware or software. When the server 103 is hardware, it may be implemented as a distributed server cluster composed of a plurality of servers, or as a single server. When the server 103 is software, it may be implemented as a plurality of software or software modules (for example, for providing distributed services), or may be implemented as a single software or software module, which is not limited herein.

It should be understood that the number of clients, networks, and servers in FIG. 1 is merely illustrative. Depending on the implementation needs, there may be any number of clients, networks, and servers.

With further reference to FIG. 2, showing a flow 200 of an embodiment of a method for training a network according to the present disclosure.

An initial semantic prediction network may comprise: an encoder network and at least one decoder network, the encoder network comprises a convolutional layer and a long short-term memory network layer; each decoder network in the at least one decoder network corresponds to a domain, and the domain corresponds to a slot in a scenario instruction.

The initial semantic prediction network may comprise the encoder network and the at least one decoder network. The encoder network may comprise: the convolutional layer and the long short-term memory network layer. An input feature of the encoder network is an input of the convolutional layer of the encoder network, an output feature of the convolutional layer of the encoder network is an input of the long short-term memory network layer of the encoder network, and an output feature of the long short-term memory network layer of the encoder network is an input of the at least one encoder network.

Inputting a first speech feature of a target speech sample into the convolutional layer, a speech feature output by the convolutional layer may be obtained. The speech feature output by the convolutional layer is extracted for feature through the long short-term memory network layer. The long short-term memory network layer uses historically extracted features to help decide a feature extracted this time, so as to obtain an intermediate feature output by the long short-term memory network layer, that is, obtain an intermediate feature output by a pre-trained encoder network. The number of long short-term memory network layers may be determined based on a prediction accuracy of the semantic prediction network, an application scenario, and experience of those skilled in the art.

Each decoder network in the at least one decoder network of the initial semantic prediction network may be a decoder network structure in the existing technology or technology developed in the future. Each decoder decodes one of all slots corresponding to an instruction involved in a particular scenario. The domain corresponding to each decoder network may correspond to the slot in the instruction involved in the particular scenario. Each decoder network in the at least one decoder network respectively decodes a slot, and contents of all slots hit by an input speech may be obtained, thereby obtaining a semantic label of the input speech.

In an example, the semantic prediction network is used for semantic recognition of an air conditioning control scenario. The semantic prediction network comprises N (a value of N is a value of the number of semantic slots hit by a control instruction involved in the air conditioning control scenario) decoder networks. In the air conditioning control scenario, a user may use a speech instruction "please turn on the air conditioner in the master bedroom at nine o'clock", and all slots involved in the speech instruction are: "time slot", "intent slot" and "location slot". A domain of a decoder network A in the N decoder networks corresponds to the "time slot". The decoder network A decodes the "time slot" and obtains a content of the "time slot" hit by "please turn on the air conditioner in the master bedroom at nine o'clock", that is, "nine o'clock"; a domain of a decoder network D in the at least one decoder network corresponds to the "intent slot". The decoder network D decodes the "intent slot" and obtains a content of the "intent slot" hit by "please turn on the air conditioner in the master bedroom at nine o'clock", that is, "turn on the air conditioner"; and a domain of a decoder network H in the at least one decoder network corresponds to the "location slot". The decoder network H decodes the "location slot" and obtains a content of the "location slot" hit by "please turn on the air conditioner in the master bedroom at nine o'clock", that is, "the master bedroom". Through a decoding output of the decoder network A, and decoding outputs of the decoder network D and the decoder network H, a semantic label "please turn on the air conditioner in the master bedroom at nine o'clock" of the input speech is obtained.

The method for training a network comprises the following steps:

Step 201, acquiring a first speech feature of a target speech sample.

In the present embodiment, an executing body of the method for training a network (for example, the server 103 shown in FIG. 1) may acquire the first speech feature of the target speech sample. The target speech sample may be a speech sample in a target speech sample set comprising a synthesized speech sample and a real speech sample, that is, the target speech sample may be the synthesized speech sample or the real speech sample. For a target speech sample in the target speech sample set, the executing body may input the target speech sample into a speech sample of the initial semantic prediction network, thereby inputting the synthesized speech sample or the real speech sample into the initial semantic prediction network. Alternatively, the method for acquiring a first speech feature of a target speech sample may be a method for acquiring a first speech feature of a target speech sample in the existing technology or technology developed in the future, which is not limited in the present disclosure. For example, the method for acquiring a first speech feature of a target speech sample may be implemented by a method having a module or a network for feature extraction. The first speech feature may be used to represent a speech characteristic of the target speech sample.

Here, the target speech sample is the synthesized speech sample or the real speech sample, the synthesized speech sample is attached with a sample syllable label and a semantic label comprising a value of the domain, and the real speech sample is attached with a sample syllable label.

The target speech sample may be the synthesized speech sample or the real speech sample. The synthesized speech sample may be synthesized and determined based on the existing technology or a speech synthesis technology in technology developed in the future, which is not limited in the present disclosure. For example, the speech synthesis technology may be end-to-end text to speech technology (TTS) or the conventional TTS.

The semantic label comprising the value of the domain may be used to mark semantics of the synthesized speech sample. The semantic label may be determined based on a method for determining a semantic label in the existing technology or technology developed in the future, which is not limited in the present disclosure. For example, the method for determining a semantic label may be implemented by a method for synthesizing keywords of a text expression and a sentence pattern of a speech sample or a method for manual labeling. Here, the value of the domain may be used to represent the content corresponding to the slot. For example, the content corresponding to the "intent slot" is "turn on the air conditioner", and the value of the domain is "turn on the air conditioner".

The sample syllable label may be used to mark each syllable in the keywords of the text expression and the sentence pattern of the synthesized speech sample; and the sample syllable label attached to the synthesized speech sample may be determined based on a method for determining a sample syllable label attached to a synthesized speech sample in the existing technology or technology developed in the future, for example, the method for determining a sample syllable label attached to a synthesized speech sample may be implemented by the method for synthesizing keywords of a text expression and a sentence pattern of a speech sample or the method for manual labeling.

The real speech sample may comprise an unprocessed speech sample and a sample syllable label obtained by recognizing the unprocessed speech sample. The unprocessed speech sample may be a speech sample actually acquired. The sample syllable label attached to the real speech sample may be used to mark each syllable in the real speech sample; and the sample syllable label of the real speech sample may be determined based on a method for determining a sample syllable label of a real speech sample in the existing technology or technology developed in the future, for example, an acoustic model for recognizing a syllable label is used to recognize the real speech sample to obtain the sample syllable label of the real speech sample.

Step 202, inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network.

In the present embodiment, the executing body may first input the first speech feature into the convolutional layer, and input the output feature of the convolutional layer into the long short-term memory network layer to obtain the first intermediate feature output by the long short-term memory network layer, then the executing body may input the first intermediate feature into the each decoder network in the at least one decoder network and the syllable classification network respectively, and use the semantic label corresponding to the first speech feature as the output of the at least one decoder network, use the sample syllable label corresponding to the first speech feature as the output of the syllable classification network, so that the first speech feature is used to jointly train the initial semantic prediction network and the syllable classification network to obtain the trained semantic prediction network.

The method for training a network provided by an embodiment of the present disclosure, may add the training of the syllable classification network to an output side of the encoder network, so that in the joint training process, the semantic label and the sample syllable label are used as constraints on the output of the initial semantic prediction network and the output of the syllable classification network, respectively. The adjustment of a parameter in the initial semantic prediction network enables the intermediate feature output by the encoder to meet the training accuracy of the semantic prediction network and the syllable classification network, thereby using a mixed training sample to improve an accuracy of the intermediate feature output by the encoder, and then may improve a prediction accuracy of the trained semantic prediction network finally obtained. In the present disclosure, semantics of a speech may be analyzed based on the speech, so that a resource overhead of converting speech into text then recognizing the semantics of the text in Background may be reduced, and the present disclosure discards the conventional acoustic decoding in the three-level cascade solution and reduces the amount of calculation.

The joint training may be in the training process the semantic prediction network, which may also train the syllable classification network to realize the adjustment of the parameter in the initial semantic prediction network.

In an example, the joint training may comprise: a training process of the initial semantic prediction network and a training process of the syllable classification network. That is, in the training process of the initial semantic prediction network, training of the syllable classification network may be added to the output side of the encoder network, so that in the joint training process, the semantic label and the sample syllable label are used as the constraints on the output of the initial semantic prediction network and the output of the syllable classification network, respectively. The adjustment of the parameter in the initial semantic prediction network enables the intermediate feature output by the encoder to meet the training accuracy of the semantic prediction network and the syllable classification network, thereby using the mixed training sample to improve the accuracy of the intermediate feature output by the encoder, and then may improve the prediction accuracy of the trained semantic prediction network finally obtained.

Figure 3:
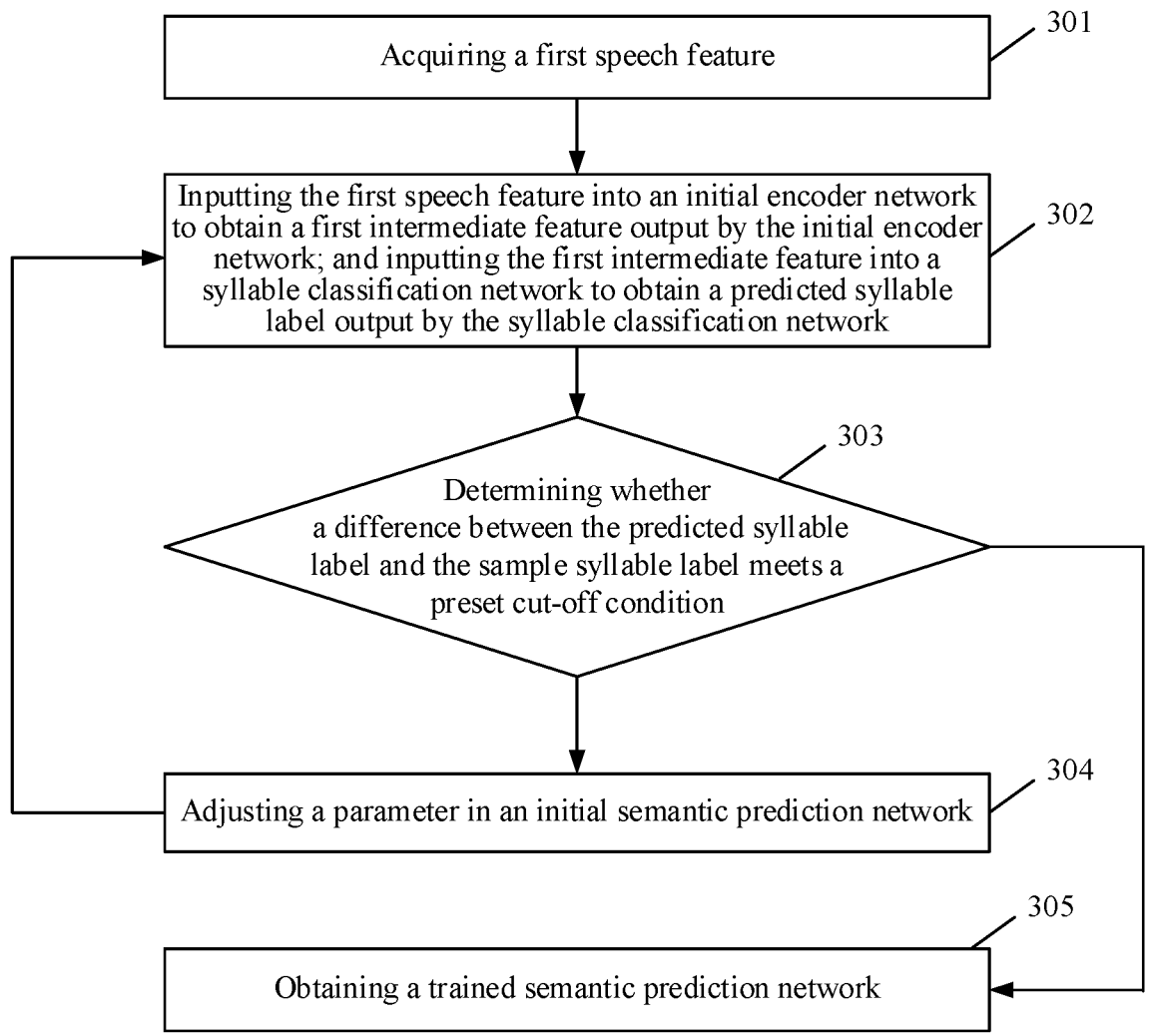
FIG. 3 is a flowchart of joint training according to the present disclosure.

For ease of understanding, FIG. 3 shows a schematic diagram of joint training. Referring to FIG. 3, steps of the joint training may comprise:

Step 301: acquiring a first speech feature of a target speech sample.

Step 302: inputting the first speech feature into an initial encoder network to obtain a first intermediate feature output by the initial encoder network; and inputting the first intermediate feature into a syllable classification network to obtain a predicted syllable label output by the syllable classification network.

Step 303: determining whether a difference between the predicted syllable label and the sample syllable label meets a preset cut-off condition.

Step 304: adjusting a parameter in an initial semantic prediction network, if the difference does not meet the preset cut-off condition, and performing steps 302 to 304.

Step 305: obtaining a trained semantic prediction network, if the difference meets the preset cut-off condition.

It should be noted that training of the syllable classification network may be added to the output side of the encoder network at any training phase in the training process of the initial semantic prediction network. In the training process of the initial semantic prediction network, generally a plurality of target speech samples are input, and steps 301 to 304 are performed for each target speech sample; step 305 is not performed until the differences corresponding to the plurality of target speech samples meet the preset cut-off condition to obtain the trained semantic prediction network. The preset cut-off condition may be set by the user based on a prediction accuracy requirement on the semantic prediction network.

The method for training a network provided by the above embodiment of the present disclosure, in the training process of the initial semantic prediction network, may add the training of the syllable classification network to the output side of the encoder network, so that in the joint training process, stop adjusting the parameter in the initial semantic prediction network when the difference between the predicted syllable label and the sample syllable label meets the preset cut-off condition, enable the intermediate feature output by the encoder to meet the training accuracy of the semantic prediction network and the syllable classification network, thereby using a mixed training sample to improve an accuracy of the intermediate feature output by the encoder, and then may improve a prediction accuracy of the trained semantic prediction network finally obtained.

In some alternative implementations of the present disclosure, the initial semantic prediction network may be determined based on steps as follows: using the synthesized speech sample as an input of an original semantic prediction network, using the semantic label corresponding to the synthesized speech sample as an output of the original semantic prediction network, and training the original semantic prediction network to obtain the initial semantic prediction network.

In this implementation, the executing body may first construct the original semantic prediction network; then, input the synthesized speech sample into the original semantic prediction network to obtain a predicted output of the original semantic prediction network; then, when a difference between the predicted output of the original semantic prediction network and the semantic label corresponding to the synthesized speech sample does not meet the preset cut-off condition, adjust a parameter in the original semantic prediction network; until a difference between a predicted output obtained by inputting the synthesized speech sample into the parameter-adjusted semantic prediction network and the semantic label corresponding to the synthesized speech sample meets the preset cut-off condition, the initial semantic prediction network is obtained.

In an example, assuming that the synthesized speech sample is the $i^{th}$ synthesized speech sample (i is a positive integer); input the $i^{th}$ synthesized speech sample into an original semantic prediction network to obtain a predicted output corresponding to the $i^{th}$ synthesized speech sample, when a difference between the predicted output corresponding to the $i^{th}$ synthesized speech sample and a sample syllable label corresponding to the $i^{th}$ synthesized speech sample does not meet a preset cut-off condition, adjust a parameter in the original semantic prediction network, after each adjustment of the parameter in the original semantic prediction network, input the $i^{th}$ synthesized speech sample again into the parameter-adjusted original semantic prediction network, to obtain a predicted output; and again, compare a difference between the predicted output and the sample syllable label corresponding to the $i^{th}$ synthesized speech sample with the preset cut-off condition; when the difference meets the preset cut-off condition, stop adjusting the parameter in the original semantic prediction network, to obtain the parameter-adjusted semantic prediction network i; next, input an $(i+1)^{th}$ synthesized speech sample into the parameter-adjusted semantic prediction network i, and determine whether the preset cut-off condition is met by judging a difference between a predicted output corresponding to the $(i+1)^{th}$ synthesized speech sample and a semantic label corresponding to the $(i+1)^{th}$ synthesized speech sample; when the difference does not meet the preset cut-off condition, adjust the parameter-adjusted semantic prediction network i until the difference meets the preset cut-off condition; . . . , input the $N^{th}$ (N is a positive integer greater than 1) synthesized speech sample into a parameter-adjusted semantic prediction network (N−1), and determine whether a difference between a predicted output corresponding to the $N^{th}$ synthesized speech sample and a semantic label corresponding to the $N^{th}$ synthesized speech sample meets the preset cut-off condition, when the difference does not meet the preset cut-off condition, adjust the parameter-adjusted semantic prediction network (N−1) until the difference meets the preset cut-off condition to obtain the initial semantic prediction network. The original semantic prediction network may be a semantic prediction network without parameter adjustment.

In this implementation, before the joint training, the synthesized speech sample and the semantic label attached to the synthesized speech sample may be used to train the original semantic prediction network to determine the initial semantic prediction network; in order to use the syllable classification network to perform auxiliary training on the initial semantic prediction network obtained by training by the original semantic prediction network in the joint training process, so that the prediction accuracy of the trained semantic prediction network may be improved.

In some alternative implementations of the present disclosure, the initial semantic prediction network may also comprise: a multi-channel speech enhancement network; the acquiring a first speech feature of a target speech sample in step 201 may comprise: inputting the target speech sample into the multi-channel speech enhancement network to obtain the first speech feature of the target speech sample output by the multi-channel speech enhancement network.

In this implementation, if the semantic prediction network also comprises the multi-channel speech enhancement network, the target speech sample may be input into the multi-channel speech enhancement network to obtain the first speech feature of the target speech sample. The multi-channel speech enhancement network may be used to extract the speech feature of the target speech sample.

The semantic prediction network in this implementation may achieve feature extraction using a composite convolutional layer in the multi-channel speech enhancement network, and integrate a feature extracted by the composite convolutional layer using a composite fully connected layer to acquire a more distinguishing speech feature in the target speech sample, thereby further realizing an accurate acquisition of the first speech feature in the target speech sample.

In some alternative implementations of the present disclosure, the encoder network is a pre-trained encoder network. The pre-trained encoder network is obtained by pre-training based on steps as follows: acquiring a second speech feature of the real speech sample; and performing following training steps on the second speech feature: inputting the second speech feature into an initial encoder network to obtain a second intermediate feature output by the initial encoder network; inputting the second intermediate feature into the syllable classification network to obtain a predicted syllable label output by the syllable classification network; adjusting, in response to a difference between the predicted syllable label and the sample syllable label not meeting a preset cut-off condition, a parameter in the initial encoder network, and jumping to perform the training steps until the difference meets the preset cut-off condition to obtain the pre-trained encoder network.

In this implementation, the acquiring a second speech feature of the real speech sample may be acquiring a second speech feature of a real speech sample in the existing technology or technology developed in the future. For example, acquiring a second speech feature of a real speech sample using a module or a network having feature extraction. The second speech feature may represent a speech characteristic of the real speech sample.

In an example, assuming that the second speech feature of the real speech sample is the $j^{th}$ second speech feature (j is a positive integer); input the $j^{th}$ second speech feature into an initial encoder network to obtain a predicted output corresponding to the $j^{th}$ second speech feature, when a difference between the predicted output corresponding to the $j^{th}$ second speech feature and a sample syllable label corresponding to the $j^{th}$ second speech feature does not meet a preset cut-off condition, adjust a parameter in the initial encoder network, after each adjustment of the parameter in the initial encoder network, input the $j^{th}$ second speech feature again into the parameter-adjusted encoder network, to obtain a predicted output; and again, compare a difference between the predicted output and the sample syllable label corresponding to the $j^{th}$ second speech feature, with the sample syllable label corresponding to the $j^{th}$ second speech feature; when the difference meets the preset cut-off condition, stop adjusting the parameter in the initial encoder network, to obtain a parameter-adjusted encoder network j; next, input the $(j+1)^{th}$ second speech feature into the parameter-adjusted encoder network j, and judge whether the preset cut-off condition is met by a difference between a predicted output corresponding to the $(j+1)^{th}$ second speech feature and a sample syllable label corresponding to the $(j+1)^{th}$ second speech feature; when the difference does not meet the preset cut-off condition, adjust a parameter in the parameter-adjusted encoder network j, and when the difference meets the preset cut-off condition, a parameter-adjusted encoder network (j+1) is obtained; . . . , input the $M^{th}$ (M is a positive integer greater than 1) second speech feature into a parameter-adjusted encoder network (M−1), and judge whether a difference between a predicted output corresponding to the $M^{th}$ second speech feature and a sample syllable label corresponding to the $M^{th}$ second speech feature meets the preset cut-off condition, when the difference does not meet the preset cut-off condition, adjust a parameter in the parameter-adjusted encoder network (M−1) until the difference meets the preset cut-off condition to obtain the pre-trained encoder network.

Figure 4:
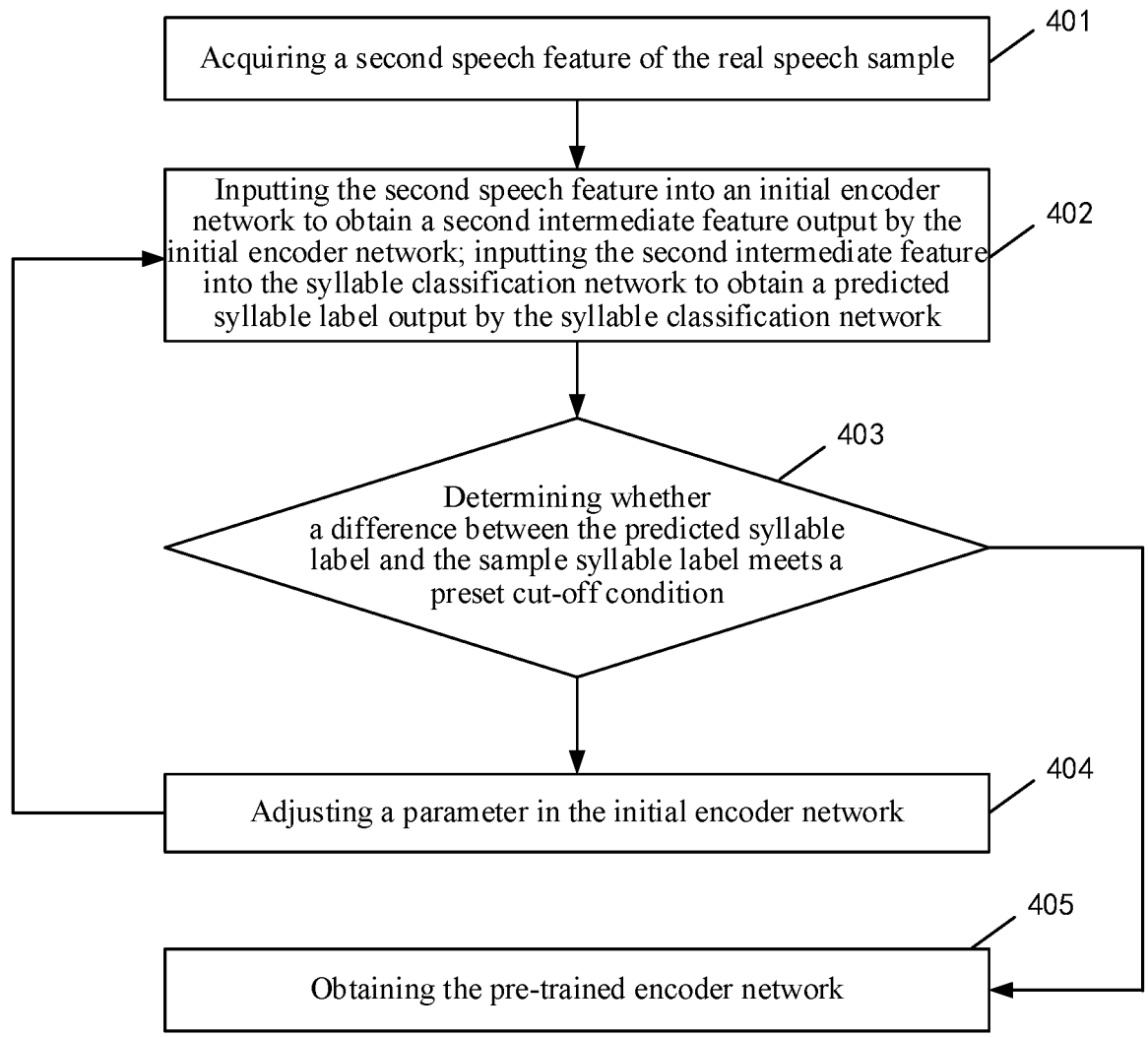
FIG. 4 is a flowchart of pre-training an encoder network according to the present disclosure.

For ease of understanding, FIG. 4 shows a flowchart of training a pre-trained encoder network. As shown in FIG. 4, steps of training the pre-trained encoder network may comprise:

Step 401, acquiring a second speech feature of the real speech sample.

Step 402: inputting the second speech feature into an initial encoder network to obtain a second intermediate feature output by the initial encoder network; inputting the second intermediate feature into the syllable classification network to obtain a predicted syllable label output by the syllable classification network.

Step 403, determining whether a difference between the predicted syllable label and the sample syllable label meets a preset cut-off condition.

Step 404: adjusting a parameter in the initial encoder network, if the difference does not meet the preset cut-off condition, and performing steps 402 to 404.

Step 405: obtaining the pre-trained encoder network, if the difference meets the preset cut-off condition.

It should be noted that, in the pre-training process, generally second speech features of a plurality of real speech samples may be input, and steps 401 to 404 are required to be performed on the second speech feature of each real speech sample; step 405 is not performed until differences corresponding to the second speech features of the plurality of real speech samples all meet the preset cut-off condition, the pre-trained encoder network is obtained.

In this implementation, before the joint training, the encoder network may be pre-trained to improve an accuracy for feature extraction of the encoder network.

In some alternative implementations of the present disclosure, each decoder network in step 201 comprises: an attention mechanism layer, a fully connected layer, and a softmax layer connected in series in sequence.

In this implementation, the attention mechanism layer weights and reduces a dimensionality of the intermediate feature output by the encoder network to obtain a plurality of features having different weights output by the attention mechanism layer; the plurality of features having different weights are input into the softmax layer through the fully connected layer, each neuron in the fully connected layer is fully connected with all neurons in the attention mechanism layer, and the fully connected layer may connect the plurality of features having different weights to obtain an output feature; then, the softmax layer outputs a classification result of the output feature.

It should be noted that corresponding weights of the attention mechanism layer in the decoder network and the attention mechanism layer in the decoder network may be different.

The at least one decoder network in this implementation may input the first speech feature of the target speech sample into the softmax layer of the decoder network through the attention mechanism layer and the fully connected layer comprised in each decoder network in the at least one decoder network, to realize an accurate output (i.e., predicted semantic label) of the first speech feature, so that a difference between the predicted semantic label and the semantic label is more accurate. Therefore, in the training process of the initial semantic prediction network, the parameter in the initial semantic prediction network may be accurately adjusted based on the difference, thereby improving the prediction accuracy of the semantic prediction network.

In some alternative implementations of the present disclosure, the syllable classification network in step 202 may comprise a fully connected layer and a softmax layer.

In this implementation, the fully connected layer comprised in the syllable classification network integrates category-discriminatory local information in the intermediate feature output by the encoder network to obtain a distinguishable distinguishing speech feature, which may then realize accurate learning of the real speech sample, so that in the joint training process, the syllable classification network may be used to perform auxiliary training on the initial semantic prediction network, which may improve the prediction accuracy of the semantic prediction network.

In some alternative implementations of the present disclosure, the synthesized speech sample in step 201 is determined based on steps as follows: acquiring a text expression and a sentence pattern for a target scenario; performing speech synthesis on the text expression and the sentence pattern for the target scenario to obtain a speech signal for the target scenario; determining a sample syllable label and a semantic label comprising a value of a domain of the speech signal for the target scenario, based on keywords of the text expression and the sentence pattern for the target scenario; and using the speech signal for the target scenario to which the sample syllable label and the semantic label comprising the value of the domain of the speech signal for the target scenario are attached as the synthesized speech sample.

In this implementation, first, the text expression and the sentence pattern for the target scenario may be acquired; then, speech synthesis is performed on the text expression and the sentence pattern for the target scenario to obtain the speech signal for the target scenario; then, based on the keywords of the text expression and the sentence pattern for the target scenario, the sample syllable label and the semantic label comprising the value of the domain of the speech signal for the target scenario are determined; finally, the speech signal for the target scenario to which the sample syllable label and the semantic label comprising the value of the domain of the speech signal for the target scenario are attached is used as the synthesized speech sample.

Here, acquiring a text expression and a sentence pattern for a target scenario may be a usage scenario of a speech that needs to be predicted. Alternatively, acquiring a text expression and a sentence pattern for a target scenario may be acquiring locally or remotely from the executing body. Performing speech synthesis on the text expression and the sentence pattern for the target scenario may obtain the speech signal for the target scenario. The method for speech synthesis may be using the existing technology or technology developed in the future, for example, using end-to-end TTS technology or the conventional TTS technology.

In this implementation, by performing synthesis on the acquired expression and the sentence pattern for the target scenario to obtain the speech signal for the target scenario; then determining the sample syllable label and the semantic label comprising the value of the domain of the speech signal for the target scenario, based on the keywords of the text expression and the sentence pattern for the target scenario; and using the speech signal for the target scenario to which the sample syllable label and the semantic label comprising the value of the domain of the speech signal for the target scenario are attached as the synthesized speech sample, an accuracy of the synthesized speech sample may be improved; and in the joint training process, using the synthesized speech sample as a training sample, the prediction accuracy of the semantic prediction network may be improved.

Figure 5:
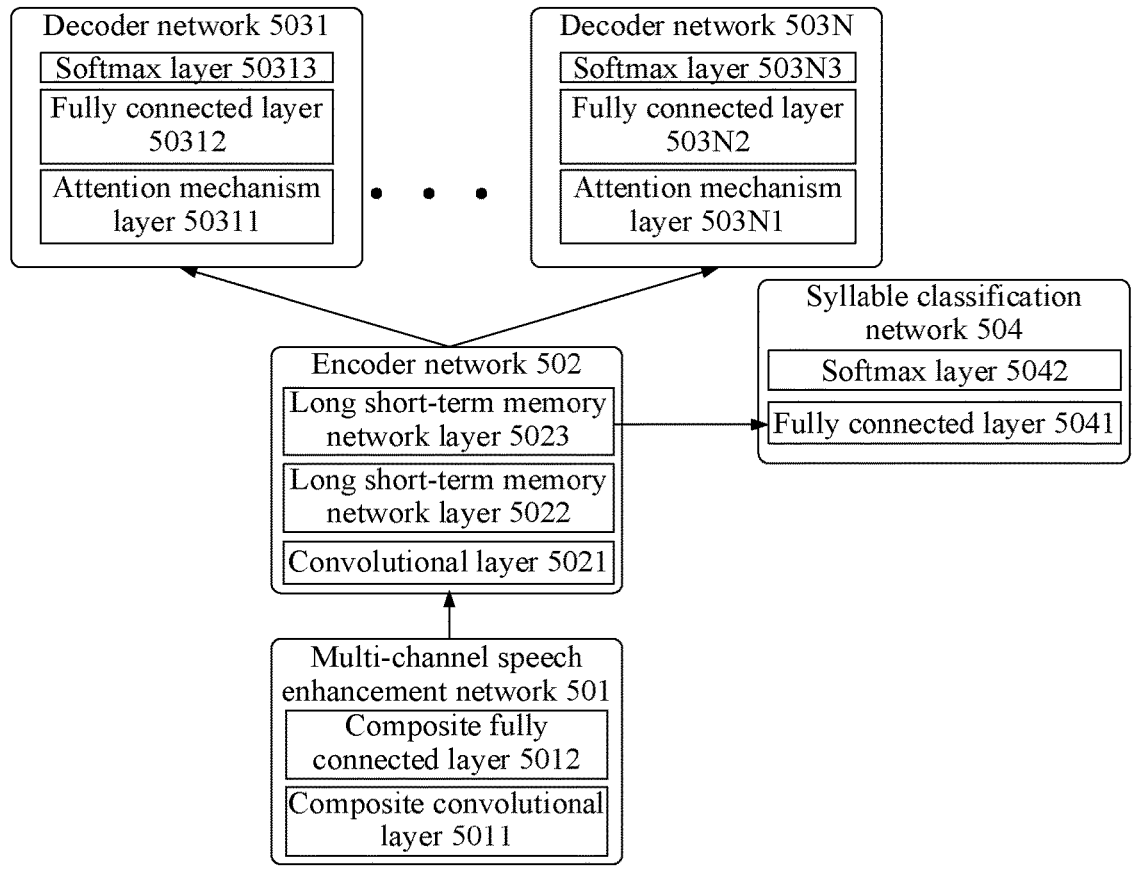
FIG. 5 is an exemplary structural diagram of a semantic prediction network and a syllable classification network for joint training according to an embodiment of the present disclosure.

With reference to FIG. 5, FIG. 5 shows an exemplary structural diagram of a semantic prediction network and a syllable classification network for joint training according to an embodiment of the present disclosure.

As shown in FIG. 5, FIG. 5 comprises: a multi-channel speech enhancement network 501, a pre-trained encoder network 502, a decoder network 5031 to a decoder network 503N, and a syllable classification network 505.

The multi-channel speech enhancement network 501 may comprise a composite convolutional layer 5011 and a composite fully connected layer 5012. Real speech samples of a plurality of channels are input into the composite convolutional layer 5011 to obtain speech features of the real speech samples; the speech features of the real speech samples are input into the composite fully connected layer 5012, each neuron in the composite fully connected layer 5012 is fully connected with all neurons in the composite convolutional layer 5011, and the composite fully connected layer 5012 may integrate category-discriminatory local information in the composite convolutional layer 5011 to obtain speech features that may better represent features of the real speech samples.

The encoder network 502 may comprise a convolutional layer 5021, a long short-term memory network layer 5022, and a long short-term memory network layer 5023. A first speech feature of a target speech sample is input into the convolutional layer 5021, to obtain a speech feature output by the convolutional layer 5021; the speech feature output by the convolutional layer 5021 is extracted for feature respectively through the long short-term memory network layer 5022 and the long short-term memory network layer 5023, where the long short-term memory network layer 5022 and the long short-term memory network layer 5023 respectively use historically extracted features to help decide a feature extracted this time, so as to obtain an intermediate feature output by the long short-term memory network layer 5023, that is, obtain an intermediate feature output by the pre-trained encoder network. It should be noted that the number of long short-term memory network layers may be determined based on a prediction accuracy of the semantic prediction network, an application scenario, and experience of those skilled in the art.

Each decoder network in the decoder network 5031 to the decoder network 503N (N is a positive integer), the decoder network 5031, may comprise an attention mechanism layer 50311, a fully connected layer 50312, and a softmax layer 50313. The attention mechanism layer 50311 may also have a pooling function. The decoder network 503N comprises an attention mechanism layer 503N1, a fully connected layer 503N2, and a softmax layer 503N3.

The decoder network 5031 is taken as an example in the following. The attention mechanism layer 50311 weights the intermediate feature output by the encoder network 502 and reduces the dimensionality to obtain a plurality of features having different weights output by the attention mechanism layer 50311; the plurality of features having different weights are respectively input into the softmax layer 50313 through the fully connected layer 50312, each neuron in the fully connected layer 50312 is fully connected with all neurons in the attention mechanism layer 50311, and the fully connected layer 50312 may connect the plurality of features having different weights to obtain an output feature; then, the softmax layer 50313 outputs a classification result of the output feature. It should be noted that corresponding weights of the attention mechanism layer 50311 in the decoder network 5031 and the attention mechanism layer 503N1 in the decoder network 503N may be different.

The syllable classification network 504 may comprise: a fully connected layer 5041 and a softmax layer 5042. The output feature of the encoder network 502 is respectively through the fully connected layer 5041 and the softmax layer 5042, each neuron in the fully connected layer 5041 is fully connected with all neurons in the long short-term memory network layer 5023 in the encoder network 502, and the fully connected layer 5041 may integrate category-discriminatory local information in the intermediate feature output by the long short-term memory network layer 5023 to obtain speech features that may better represent features of the real speech samples; then, the softmax layer 5042 outputs a classification result that may better represent the features of the real speech samples.

After the encoder network is pre-trained, the fully connected layer and the softmax layer in the syllable classification network may be cropped, and then the encoder network and the at least one decoder network may be spliced to obtain the initial semantic prediction network.

The exemplary structural diagram shown in the above FIG. 5 uses the semantic prediction network method in the above embodiment to jointly train the initial semantic prediction network and the syllable classification network to obtain the trained semantic prediction network. In this process, compared with the three-level cascade speech recognition technology used in Background, in the present disclosure, in the training process of the initial semantic prediction network, training of the syllable classification network may be added to an output side of the encoder network, so that in the joint training process, the semantic label and the sample syllable label are used as constraints on the output of the initial semantic prediction network and the output of the syllable classification network, respectively. The adjustment of a parameter in the initial semantic prediction network enables the intermediate feature output by the encoder to meet the training accuracy of the semantic prediction network and the syllable classification network, thereby using a mixed training sample to improve an accuracy of the intermediate feature output by the encoder, and then may improve a prediction accuracy of the trained semantic prediction network finally obtained. In the present disclosure, semantics of a speech may be analyzed based on the speech, so that a resource overhead of converting speech into text then recognizing the semantics of the text in Background may be reduced, and the present disclosure discards the conventional acoustic decoding in the three-level cascade solution and reduces the amount of calculation.

Figure 6:
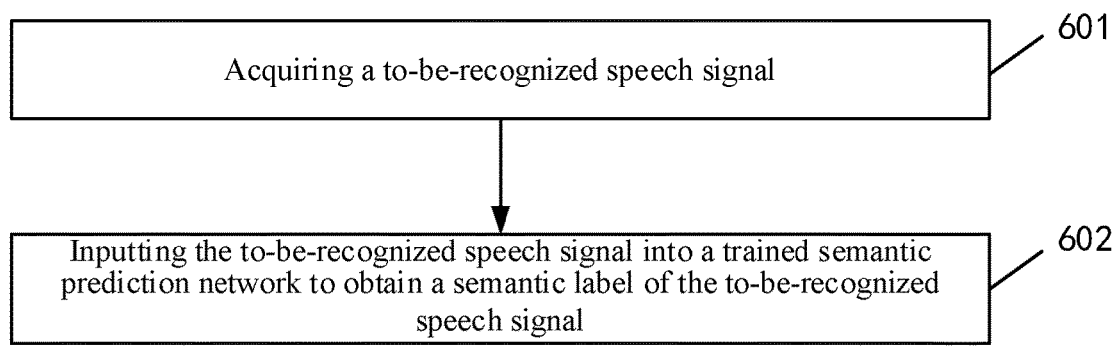
FIG. 6 is a flowchart of an embodiment of a method for recognizing semantics according to the present disclosure.

With further reference to FIG. 6, showing a flow 600 of an embodiment of a method for recognizing semantics. The method for recognizing semantics comprises the following steps:

Step 601: acquiring a to-be-recognized speech signal.

In this implementation, an executing body of the method for recognizing semantics (for example, the client 101 or the server 103 in FIG. 1) may acquire the to-be-recognized speech signal.

Step 602: inputting the to-be-recognized speech signal into a trained semantic prediction network to obtain a semantic label of the to-be-recognized speech signal.

The method for recognizing semantics provided by the above embodiment of the present disclosure may realize an accurate determination of the semantic label of the to-be-recognized speech signal using the semantic prediction network.

Figure 7:
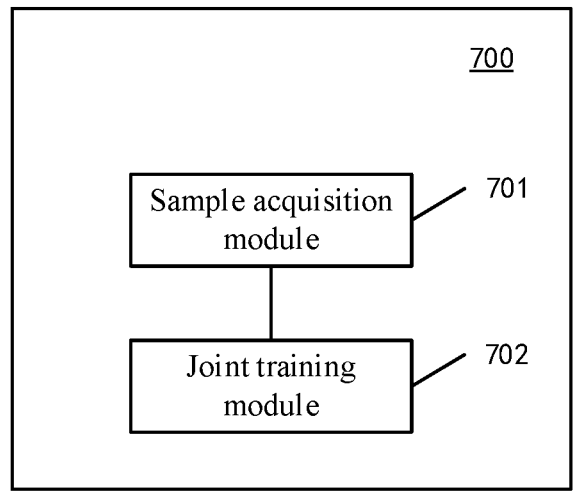
FIG. 7 is a schematic structural diagram of an embodiment of an apparatus for training a network according to the present disclosure.

With further reference to FIG. 7, as an implementation of the method shown in the above figures, the present disclosure provides an embodiment of an apparatus for training a network, and the apparatus embodiment corresponds to the method embodiment as shown in FIG. 2. The apparatus may be particularly applied to various electronic devices.

As shown in FIG. 7, an initial semantic prediction network comprises: an encoder network and at least one decoder network, the encoder network comprises a convolutional layer and a long short-term memory network layer; each decoder network in the at least one decoder network corresponds to a domain, the domain corresponds to a slot in a scenario instruction; and an apparatus 700 for training a network of the present embodiment may comprise: a sample acquisition module 701, configured to acquire a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and a joint training module 702, configured to input the first speech feature into the convolutional layer, input an output feature of the convolutional layer into the long short-term memory network layer, input a first intermediate feature output from the long short-term memory network layer into the each decoder network in the at least one decoder network, use the semantic label corresponding to the first speech feature as an output of the at least one decoder network, use the first intermediate feature as an input of a syllable classification network, use the sample syllable label corresponding to the first speech feature as an output of the syllable classification network, and jointly train the initial semantic prediction network and the syllable classification network to obtain a trained semantic prediction network.

In the present embodiment, in the apparatus 700 for training a network, for the particular processing and the technical effects of the sample acquisition module 701 and the joint training module 702, reference may be made to the relevant description of steps 201-202 in the corresponding embodiment of FIG. 2 respectively, and detailed description thereof will be omitted.

In some alternative implementations of the present embodiment, the apparatus 700 for training a network also comprises: a sematic training module (not shown in the figure), configured to use the synthesized speech sample as an input of an original semantic prediction network, use the semantic label corresponding to the synthesized speech sample as an output of the original semantic prediction network, and train the original semantic prediction network to obtain the initial semantic prediction network.

In some alternative implementations of the present embodiment, the initial semantic prediction network also comprises: a multi-channel speech enhancement network; and the sample acquisition module 701 is further configured to: input the target speech sample into the multi-channel speech enhancement network to obtain the first speech feature of the target speech sample output by the multi-channel speech enhancement network.

In some alternative implementations of the present embodiment, the encoder network is a pre-trained encoder network; and the apparatus 700 for training a network also comprises: a feature acquisition module (not shown in the figure), configured to acquire a second speech feature of the real speech sample; and a pretraining module (not shown in the figure), configured to perform following training steps on the second speech feature: inputting the second speech feature into an initial encoder network to obtain a second intermediate feature output by the initial encoder network; inputting the second intermediate feature into the syllable classification network to obtain a predicted syllable label output by the syllable classification network; adjusting, in response to a difference between the predicted syllable label and the sample syllable label not meeting a preset cut-off condition, a parameter in the initial encoder network, and jumping to perform the training steps until the difference meets the preset cut-off condition to obtain the pre-trained encoder network.

In some alternative implementations of the present embodiment, the each decoder network comprises: an attention mechanism layer, a fully connected layer, and a softmax layer connected in series in sequence.

In some alternative implementations of the present embodiment, the syllable classification network comprises a fully connected layer and a softmax layer.

In some alternative implementations of the present embodiment, the apparatus 700 for training a network also comprises: a text acquisition module (not shown in the figure), configured to acquire a text expression and a sentence pattern for a target scenario; a synthesis speech module (not shown in the figure), configured to perform speech synthesis on the text expression and the sentence pattern for the target scenario to obtain a speech signal for the target scenario; a label determination module (not shown in the figure), configured to determine a sample syllable label and a semantic label comprising a value of a domain of the speech signal for the target scenario, based on keywords of the text expression and the sentence pattern for the target scenario; and a speech determination module (not shown in the figure), configured to use the speech signal for the target scenario to which the sample syllable label and the semantic label comprising the value of the domain of the speech signal for the target scenario are attached as the synthesized speech sample.

Figure 8:
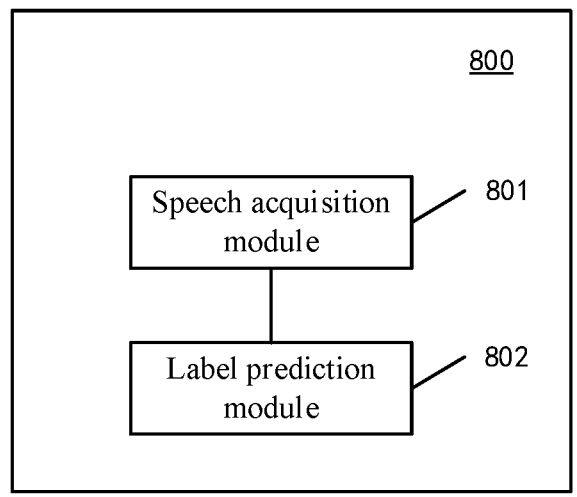
FIG. 8 is a schematic structural diagram of an embodiment of an apparatus for recognizing semantics according to the present disclosure.

With further reference to FIG. 8, as an implementation of the method shown in the above figure, the present disclosure provides an embodiment of an apparatus for recognizing semantics, and the apparatus embodiment corresponds to the method embodiment as shown in FIG. 6. The apparatus may be particularly applied to various electronic devices.

As shown in FIG. 8, an apparatus 800 for recognizing semantics of the present embodiment may comprise: a speech acquisition module 801, configured to acquire a to-be-recognized speech signal; and a label prediction module 802, configured to input the to-be-recognized speech signal into a trained semantic prediction network trained using the method as shown in FIG. 2 to obtain a semantic label of the to-be-recognized speech signal.

In the present embodiment, in the apparatus 800 for recognizing semantics, for the particular processing and the technical effects of the speech acquisition module 801 and the label prediction module 802, reference may be made to the relevant description of steps 601-602 in the corresponding embodiment of FIG. 6 respectively, and detailed description thereof will be omitted.

Figure 9:
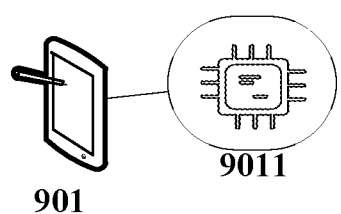
FIG. 9 is an application scenario for setting a chip.

With further reference to FIG. 9, the present disclosure provides an embodiment of an application scenario for setting a chip. As shown in FIG. 9, the application scenario for setting a chip may comprise: a client 901 and a chip 9011 set in the client 901.

In a phase of predicting a semantic label using a trained semantic prediction network, the client 901 may acquire a to-be-recognized speech signal, and the chip 9011 may predict the to-be-recognized speech signal acquired by the client 901 using the trained semantic prediction network, to obtain the semantic label of the to-be-recognized speech signal.

It should be noted that, before the semantic label of the to-be-recognized speech signal is predicted by the semantic prediction network, the trained semantic prediction network may also be deployed to the chip 9011. Alternatively, a method for the server 103 to deploy the trained semantic prediction network to the chip 9011 may be a deployment method in the existing technology or technology developed in the future.

In this implementation, for the chip set in the client, because the semantic prediction network trained in the chip has a high prediction accuracy, it may improve an accuracy for recognizing the semantic label of the to-be-recognized speech signal in an offline status. In addition, since a size of the trained semantic prediction network arranged in the chip is small, a hardware loss of semantic prediction may be reduced and a resource overhead in the prediction process may be reduced.

According to an embodiment of the present disclosure, the present disclosure also provides an electronic device and a readable storage medium.

Figure 10:
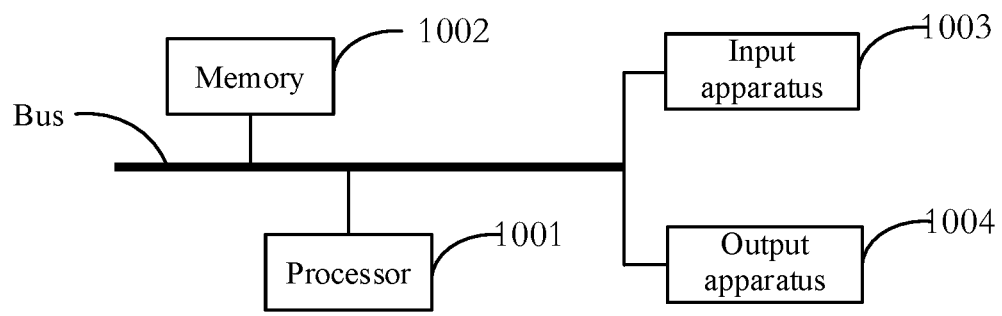
FIG. 10 is a block diagram of an electronic device used to implement the method for training a network or the method for recognizing semantics according to the embodiments of the present disclosure.

As shown in FIG. 10, is a block diagram of an electronic device of a method for training a network or recognizing semantics according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device comprises: one or more processors 1001, a memory 1002, and interfaces for connecting various components, comprising high-speed interfaces and low-speed interfaces. The various components are connected to each other using different buses, and may be installed on a common motherboard or in other methods as needed. The processor may process instructions executed within the electronic device, comprising instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 10, one processor 101001 is used as an example.

The memory 1002 is a non-transitory computer readable storage medium provided by the present disclosure. The memory stores instructions executable by at least one processor, so that the at least one processor performs the method for training a network or the method for recognizing semantics provided by the present disclosure. The non-transitory computer readable storage medium of the present disclosure stores computer instructions for causing a computer to perform the method for training a network or the method for recognizing semantics provided by the present disclosure.

The memory 1002, as a non-transitory computer readable storage medium, may be used to store non-transitory software programs, non-transitory computer executable programs and modules, such as program instructions/modules corresponding to the method for training a network or the method for recognizing semantics in the embodiments of the present disclosure (for example, the sample acquisition module 701 and the joint training module 702 as shown in FIG. 7; or, the speech acquisition module 801 and the label prediction module 802 as shown in FIG. 8). The processor 1001 executes the non-transitory software programs, instructions, and modules stored in the memory 1002 to execute various functional applications and data processing of the server, that is, to implement the method for training a network or the method for recognizing semantics in the foregoing method embodiments.

The memory 1002 may comprise a storage program area and a storage data area, wherein the storage program area may store an operating system and an application program required by at least one function; and the storage data area may store such as data created by the use of the electronic device according to the method for training a network or the method for recognizing semantics. In addition, the memory 1002 may comprise a high-speed random access memory, and may also comprise a non-transitory memory, such as at least one magnetic disk storage device, a flash memory or other non-transitory solid state storage devices. In some embodiments, the memory 1002 may optionally comprise a memory disposed remotely relative to processor 1001, which may be connected through a network to the electronic device of the method for training a network or the method for recognizing semantics. Examples of such networks comprise, but are not limited to, the Internet, enterprise intranets, local area networks, mobile communication networks and combinations thereof.

The electronic device of the method for training a network or the method for recognizing semantics may also comprise: an input apparatus 1003 and an output apparatus 1004. The processor 1001, the memory 1002, the input apparatus 1003 and the output apparatus 1004 may be connected through a bus or in other ways, and an example of the connection through a bus is shown in FIG. 10.

The input apparatus 1003 may receive input digital or character information, and generate key signal inputs related to user settings and function control of the electronic device of the method for training a network or recognizing semantics, such as touch screen, keypad, mouse, trackpad, touchpad, pointing stick, one or more mouse buttons, trackball, joystick and other input apparatuses. The output apparatus 1004 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, comprising machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), the Internet, and blockchain networks.

The computer system may comprise a client and a server. The client and the server are generally far from each other and usually interact through the communication network. The relationship between the client and the server is generated by computer programs that run on the corresponding computer and have a client-server relationship with each other.

The method and apparatus for training a network, the device and the storage medium provided by the embodiments of the present disclosure, an initial semantic prediction network comprising: an encoder network and at least one decoder network, the encoder network comprising a convolutional layer and a long short-term memory network layer; each decoder network in the at least one decoder network corresponding to a domain, the domain corresponding to a slot in a scenario instruction; first acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; then inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network. In this process, compared with the three-level cascade speech recognition technology used in Background, in the present disclosure, in the training process of the initial semantic prediction network, training of the syllable classification network may be added to an output side of the encoder network, so that in the joint training process, the semantic label and the sample syllable label are used as constraints on the output of the initial semantic prediction network and the output of the syllable classification network, respectively. The adjustment of a parameter in the initial semantic prediction network enables the intermediate feature output by the encoder to meet the training accuracy of the semantic prediction network and the syllable classification network, thereby using a mixed training sample to improve an accuracy of the intermediate feature output by the encoder, and then may improve a prediction accuracy of the trained semantic prediction network finally obtained. In the present disclosure, semantics of a speech may be analyzed based on the speech, so that a resource overhead of converting speech into text then recognizing the semantics of the text in Background may be reduced, and the present disclosure discards the conventional acoustic decoding in the three-level cascade solution and reduces the amount of calculation.

Artificial intelligence is the study of computers to simulate certain human thinking procedures and intelligent behaviors (such as learning, reasoning, thinking, or planning). It has both hardware-level technologies and software-level technologies. Artificial intelligence hardware technologies typically comprise technologies such as sensors, dedicated artificial intelligence chips, cloud computing, distributed storage, and big data processing; and artificial intelligence software technologies mainly comprise computer vision technology, speech recognition technology, natural speech processing technology, machine learning/deep learning, big data processing technology, knowledge map technology and other major directions.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above particular embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be comprised in the protection scope of the present disclosure.

What is claimed is:

1. A method for training a network, wherein an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; and the method comprising:

acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network.

2. The method according to claim 1, wherein the initial semantic prediction network is determined based on steps as follows:

using the synthesized speech sample as an input of an original semantic prediction network, using the semantic label corresponding to the synthesized speech sample as an output of the original semantic prediction network, and training the original semantic prediction network to obtain the initial semantic prediction network.

3. The method according to claim 1, wherein the initial semantic prediction network further comprises: a multi-channel speech enhancement network;

the acquiring a first speech feature of a target speech sample comprises: inputting the target speech sample into the multi-channel speech enhancement network to obtain the first speech feature of the target speech sample output by the multi-channel speech enhancement network.

4. The method according to claim 2, wherein the initial semantic prediction network further comprises: a multi-channel speech enhancement network;

the acquiring a first speech feature of a target speech sample comprises: inputting the target speech sample into the multi-channel speech enhancement network to obtain the first speech feature of the target speech sample output by the multi-channel speech enhancement network.

5. The method according to claim 1, wherein the encoder network is a pre-trained encoder network;
the pre-trained encoder network is obtained by pre-training based on steps as follows:
acquiring a second speech feature of the real speech sample; and
performing following training steps on the second speech feature: inputting the second speech feature into an initial encoder network to obtain a second intermediate feature output by the initial encoder network; inputting the second intermediate feature into the syllable classification network to obtain a predicted syllable label output by the syllable classification network; adjusting, in response to a difference between the predicted syllable label and the sample syllable label not meeting a preset cut-off condition, a parameter in the initial encoder network, and jumping to perform the training steps until the difference meets the preset cut-off condition to obtain the pre-trained encoder network.

6. The method according to claim 2, wherein the encoder network is a pre-trained encoder network;
the pre-trained encoder network is obtained by pre-training based on steps as follows:
acquiring a second speech feature of the real speech sample; and
performing following training steps on the second speech feature: inputting the second speech feature into an initial encoder network to obtain a second intermediate feature output by the initial encoder network; inputting the second intermediate feature into the syllable classification network to obtain a predicted syllable label output by the syllable classification network; adjusting, in response to a difference between the predicted syllable label and the sample syllable label not meeting a preset cut-off condition, a parameter in the initial encoder network, and jumping to perform the training steps until the difference meets the preset cut-off condition to obtain the pre-trained encoder network.

7. The method according to claim 1, wherein the each decoder network comprises: an attention mechanism layer, a fully connected layer, and a softmax layer connected in series in sequence.

8. The method according to claim 1, wherein the syllable classification network comprises a fully connected layer and a softmax layer.

9. The method according to claim 1, wherein the synthesized speech sample is determined based on steps as follows:
acquiring a text expression and a sentence pattern for a target scenario;
performing speech synthesis on the text expression and the sentence pattern for the target scenario to obtain a speech signal for the target scenario;
determining a sample syllable label and a semantic label comprising a value of a domain of the speech signal for the target scenario, based on keywords of the text expression and the sentence pattern for the target scenario; and
using the speech signal for the target scenario to which the sample syllable label and the semantic label comprising the value of the domain of the speech signal for the target scenario are attached as the synthesized speech sample.

10. A method for recognizing semantics, the method comprising:
acquiring a to-be-recognized speech signal; and
inputting the to-be-recognized speech signal into a trained semantic prediction network trained using the method according to claim 1 to obtain a semantic label of the to-be-recognized speech signal.

11. A method for recognizing semantics, the method comprising:
acquiring a to-be-recognized speech signal; and
inputting the to-be-recognized speech signal into a trained semantic prediction network trained using the method according to claim 2 to obtain a semantic label of the to-be-recognized speech signal.

12. A method for recognizing semantics, the method comprising:
acquiring a to-be-recognized speech signal; and
inputting the to-be-recognized speech signal into a trained semantic prediction network trained using the method according to claim 3 to obtain a semantic label of the to-be-recognized speech signal.

13. A method for recognizing semantics, the method comprising:
acquiring a to-be-recognized speech signal; and
inputting the to-be-recognized speech signal into a trained semantic prediction network trained using the method according to claim 5 to obtain a semantic label of the to-be-recognized speech signal.

14. A chip, wherein the chip is configured with a trained semantic prediction network trained using the method according to claim 1.

15. A chip, wherein the chip is configured with a trained semantic prediction network trained using the method according to claim 2.

16. A chip, wherein the chip is configured with a trained semantic prediction network trained using the method according to claim 3.

17. A chip, wherein the chip is configured with a trained semantic prediction network trained using the method according to claim 5.

18. A chip, wherein the chip is configured with a trained semantic prediction network trained using the method according to claim 7.

19. An electronic device, comprising:
at least one processor; and
a memory, communicatively connected to the at least one processor; wherein,
the memory, storing instructions executable by the at least one processor, the instructions, when executed by the at least one processor, cause the at least one processor to perform an operation for processing information, wherein an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; and the operation comprising:
acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and
inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network;

or cause the at least one processor to perform an operation for recognizing semantics, comprising:

acquiring a to-be-recognized speech signal; and inputting the to-be-recognized speech signal into a trained semantic prediction network trained using the operation for processing information to obtain a semantic label of the to-be-recognized speech signal.

20. A non-transitory computer readable storage medium, storing computer instructions, the computer instructions, being used to cause the computer to perform an operation for processing information, wherein an initial semantic prediction network comprises: an encoder network and at least one decoder network, the encoder network comprising a convolutional layer and a long short-term memory network layer; each decoder network in the at least one decoder network corresponding to a domain, the domain corresponding to a slot in a scenario instruction; and the operation comprising:

acquiring a first speech feature of a target speech sample; the target speech sample being a synthesized speech sample or a real speech sample, the synthesized speech sample being attached with a sample syllable label and a semantic label comprising a value of the domain, and the real speech sample being attached with a sample syllable label; and inputting the first speech feature into the convolutional layer, inputting an output feature of the convolutional layer into the long short-term memory network layer, inputting a first intermediate feature output from the long short-term memory network layer into the each decoder network in the at least one decoder network, using the semantic label corresponding to the first speech feature as an output of the at least one decoder network, using the first intermediate feature as an input of a syllable classification network, using the sample syllable label corresponding to the first speech feature as an output of the syllable classification network, and jointly training the initial semantic prediction network and the syllable classification network to obtain a trained semantic prediction network;

or cause the at least one processor to perform an operation for recognizing semantics, comprising:

acquiring a to-be-recognized speech signal; and inputting the to-be-recognized speech signal into a trained semantic prediction network trained using the operation for processing information to obtain a semantic label of the to-be-recognized speech signal.

* * * * *